Figure 1:
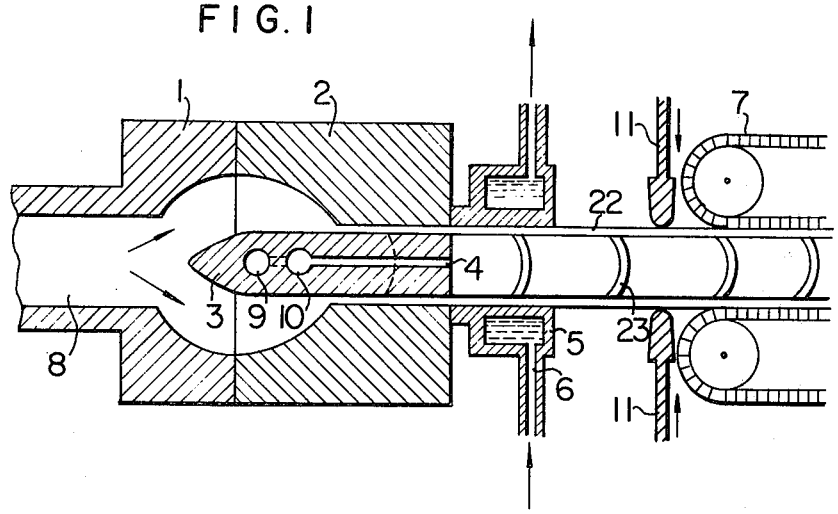

United States Patent [19]

Shibata et al.

[11] 3,929,951
[45] Dec. 30, 1975

[54] METHOD OF EXTRUDING HOLLOW STRUCTURE HAVING PLURAL PARALLEL CELLS

[75] Inventors: Osamu Shibata, Suita; Susumu Kojimoto, Ibaragi; Takami Sato, Toyonaka; Yoshio Tadokoro, Ibaragi, all of Japan

[73] Assignee: Sumitomo Chemical Company, Limited, Osaka, Japan

[22] Filed: July 16, 1974

[21] Appl. No.: 489,061

[30] Foreign Application Priority Data
July 18, 1973  Japan................................ 48-81520

[52] U.S. Cl. ...................... 264/89; 264/94; 264/99; 264/100; 264/177 R; 264/209; 264/210
[51] Int. Cl.²...................... B29D 23/04; B29F 3/00
[58] Field of Search ......... 264/93, 94, 89, 177, 209, 264/21 DR; 156/244, 285

[56] References Cited
UNITED STATES PATENTS
3,274,315   9/1966   Kawamura............................ 264/93
3,709,967   1/1973   Held .................................... 264/96

Primary Examiner—Robert F. White
Assistant Examiner—Willard E. Hoag
Attorney, Agent, or Firm—Stevens, Davis, Miller & Mosher

[57]  ABSTRACT

A hollow structure of thermoplastic material which is light in weight and exhibits excellent mechanical strength property and heat insulation property is produced by forming a resin path by a die body and a core member for the extrusion of the hollow structure comprising an outer shell having a plurality of spaces at an opening thereof and diaphragms, extruding the thermoplastic resin into the core member from the die equipped with a gas path having at least two circuits communicating with said spaces, blowing gas alternately into the spaces within the extruded hollow structure through said circuits to expand and move the diaphragms to fuse alternate diaphragms with their adjoining diaphragms or outer shell so that the hollow sections can be formed into isolated chambers for each of the alternate gas blows while preventing the substantial expansion of the outer shell of the hollow body by contact with a cooling unit following the die.

1 Claim, 28 Drawing Figures

METHOD OF EXTRUDING HOLLOW STRUCTURE HAVING PLURAL PARALLEL CELLS

The present invention relates to an extrusion molding method for thermoplastic resin, and more particularly it relates to a method for manufacturing a structure of thermoplastic resin having isolated hollow sections.

Heretofore, the structures having isolated hollow sections have been used as construction parts, heat isolation materials, wrapping materials or the like since they are light in weight and exhibit excellent mechanical strength property and heat isolation property, and many attempts have been made to apply thermoplastic resin for these purposes.

However, in the past, considerable efforts must have been paid to form isolated hollow sections in such a structure with respect to the joining method and hence the prior art attempts have not been always advantageous with regard to their costs.

As an alternative approach using thermoplastic resin, many methods have been proposed to form the hollow sections simultaneously with the outer shell making use of the thermoplastic property of the material, but they include many technical problems to be resolved and hence they are not yet practical.

As an example, Japanese Patent Publication No. 24062/67 discloses a molding die for molding a pair of parallel plates and a number of interconnecting diaphragms, wherein the molding die includes therein a guide plate which can be reciprocated for permitting zig-zag movement of the respective diaphragms. However, the construction is complicated and the leakage of the resin from the moving parts of the die is inevitable.

Japanese Patent Publication No. 2217/73 discloses a method for forming a number of discrete air cells in a sheet by extruding the sheet continuously from a T-die having an elongated straight slit and a number of air blow-in ports arranged in a spaced relation to each other inside of and adjacent to an opening of the slit, and blowing air intermittently from the number of air blow-in ports to expand the sheet discretely from the inside thereof. In this method, since the blow-in of the air is unstable it is difficult to stably produce discrete air cells which are uniform in shape and the resulting products are apt to have evenness or wrinkles on their surfaces.

The inventors of the present invention made an extensive study to overcome those disadvantages of the prior art and finally completed the present invention.

It is an object of the present invention to provide a method for manufacturing a hollow structure of thermoplastic resin having isolated hollow sections, in a simple manner and on mass production bases. In order to obtain a good structure having isolated hollow sections each having a size of 40 mm × 45 mm × 25 mm, it is best to conduct the molding under the air-blowing condition of about 0.05 kg/cm². However, the air-blowing condition varies generally depending upon some factors such as the form of the hollow desired and the change of cycle needed, and the condition is selected in the range of 0.001 to 10 kg/cm².

It is other object of the present invention to provide an apparatus for manufacturing such a structure.

It is still other object of the present invention to provide a hollow structure of thermoplastic resin which is light in weight and exhibits excellent mechanical strength property and heat insulation property.

Further objects of the present invention will be clear from the following description.

According to the present invention, a method for manufacturing a hollow structure of thermoplastic resin is provided wherein a die body and a core member form a resin path for the extrusion of the hollow structure comprising an outer shell having a plurality of spaces at an opening thereof and diaphragms, and thermoplastic resin is continuously extruded into the core member from the die which is provided with a gas path having at least two circuits communicating with said spaces, and gas is blown into alternate ones of the spaces within the extruded hollow structure through said circuits to expand and move the diaphragms to fuse alternate diaphragms with their adjacent diaphragms or outer shells to form the hollow sections into isolated chambers for each alternate air blow-in. The substantial expansion of the outer shell of the hollow body is prevented by the contact thereof with a cooling member following the die.

The present invention will now be described specifically with reference to the accompanying drawings, although it should be understood that the present invention is not limited to any of the particular illustrations.

Figure 2:
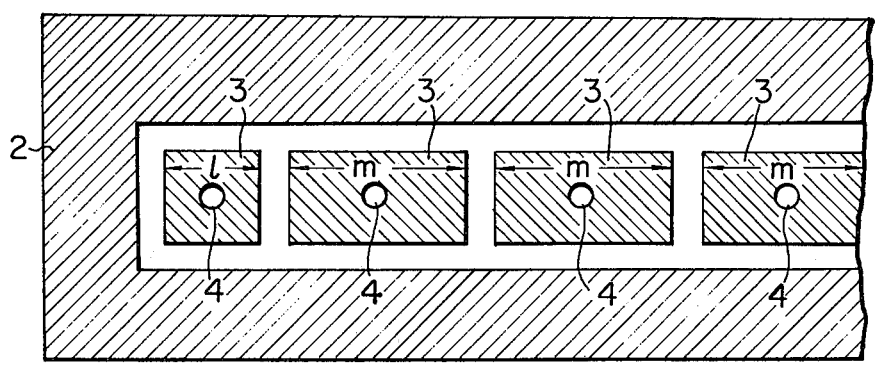
Figure 3:
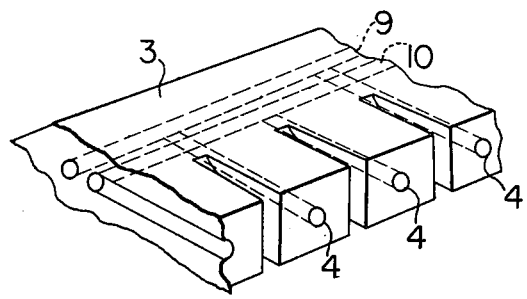
Figure 4A:
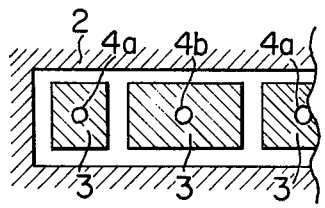
Figure 4B:
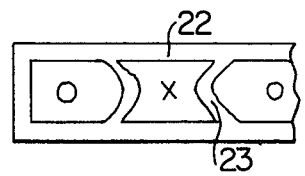
Figure 4C:
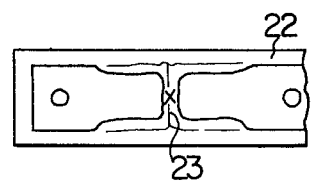
Figure 4D:
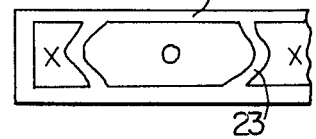
Figure 4E:
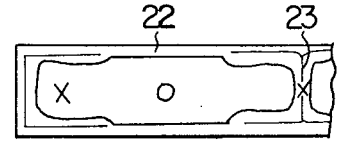
Figure 5:
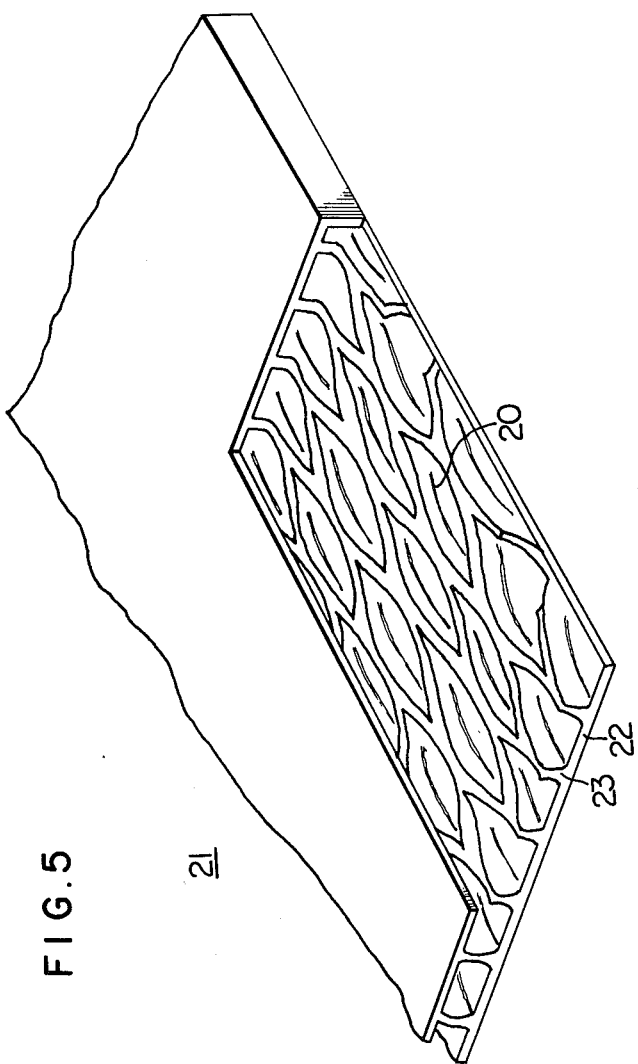
Figure 6A:
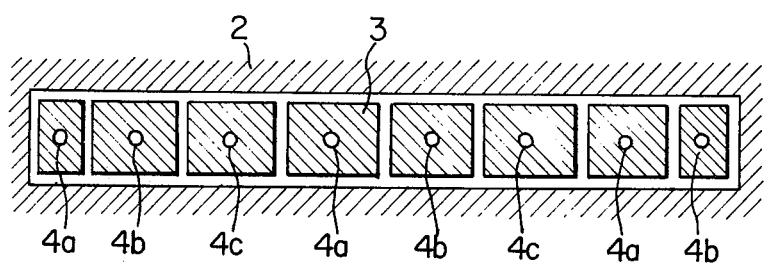
Figure 6B:
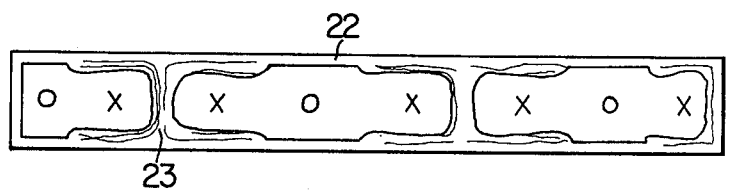
Figure 6C:
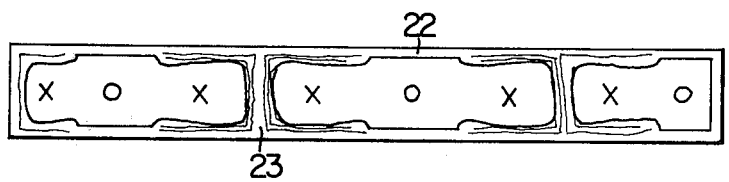
Figure 6D:
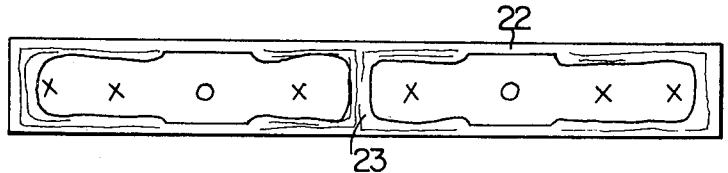
Figure 7A:
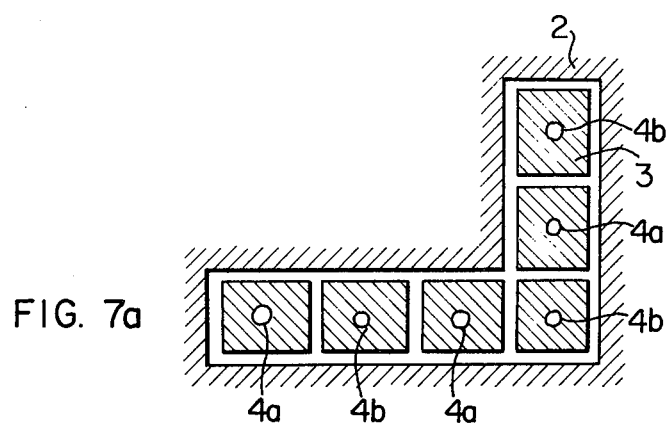
Figure 7B:
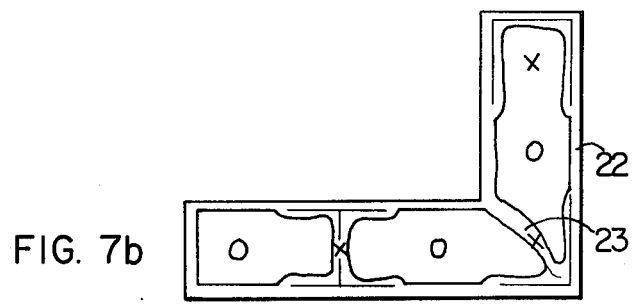
Figure 7C:
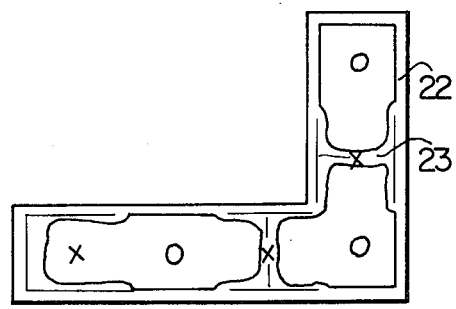
Figure 8A:
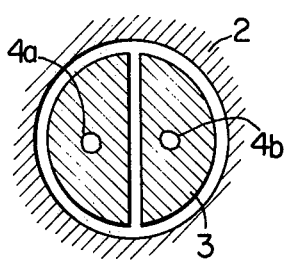
Figure 9A:
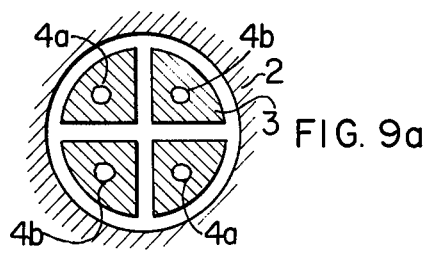
Figure 8B:
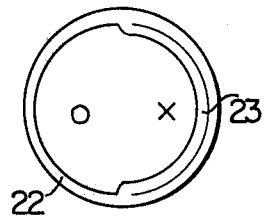
Figure 9B:
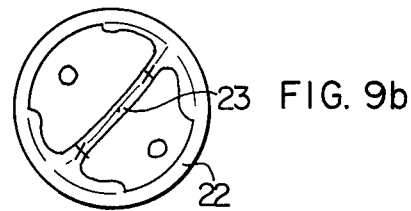
Figure 8C:
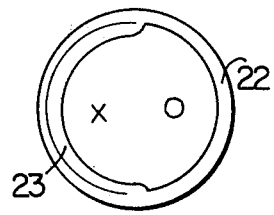
Figure 9C:
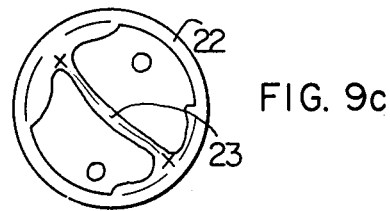
Figure 10A:
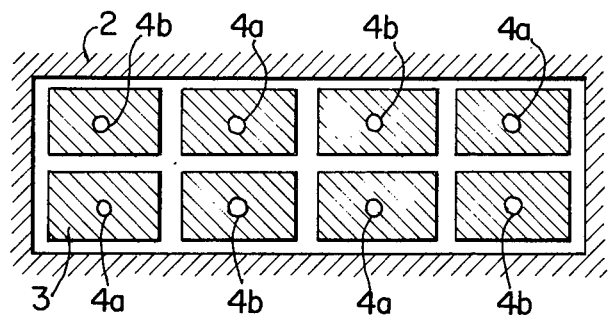
Figure 10B:
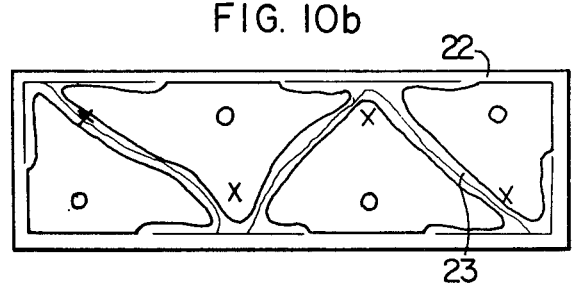
Figure 10C:
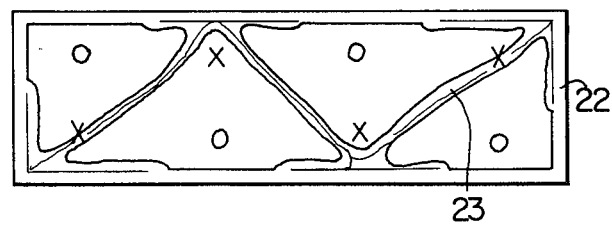
Figure 11A:
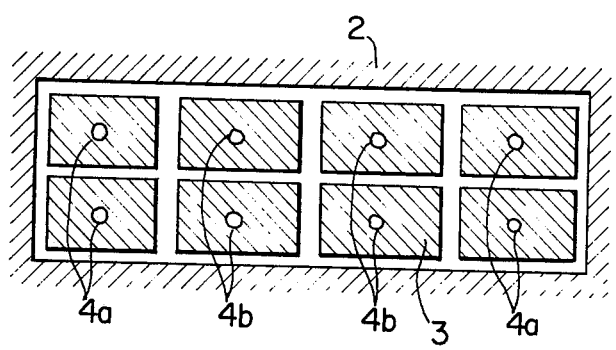
Figure 11B:
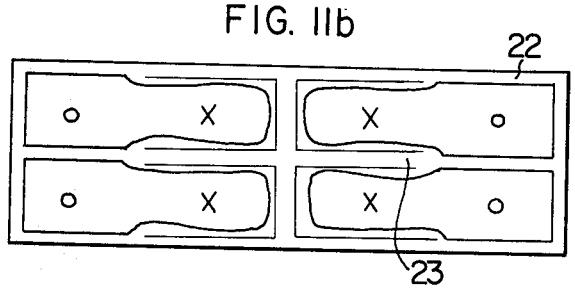
Figure 11C:
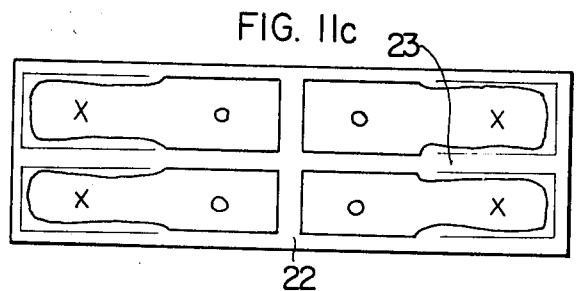

In the accompanying drawings:

FIG. 1 shows a schematic cross sectional view of an example of apparatus used in the present invention, FIG. 2 is a front view of a die, FIG. 3 is a perspective view of a core member, FIG. 4 shows a front view of a die exit port $a$ and front sectional views of a hollow plate structure ($b - e$) in the course of molding process, FIG. 5 is a perspective view of the hollow plate structure formed in accordance with an embodiment of the present invention, FIG. 6 shows a front view of the die exit port $a$ and front sectional views of the hollow plate structure ($b - e$) in the course of the molding process, and FIGS. 7 – 11 respectively show front views of the die exit ports $a$ and front sectional views of the hollow plate structures ($b$, $c$) in the course of the molding process.

Referring to the drawings, FIGS. 1 – 4 illustrate the embodiments in accordance with the present invention to prepare a hollow plate structure 21 having isolated or discrete hollow sections 20 as shown in FIG. 5, as well as an apparatus for manufacturing the structure. In FIGS. 1 and 2, a die comprises a die head 1 coupled to an extruder, not shown, a die body 2 and a core member 3. A cooling unit 5 equipped with a water cooling mechanism 6 is arranged following the die body 2, the inner dimension of the cooling unit 5 being substantially equal to the dimension of the die body 2. In FIG. 2, the designations $l$ and $m$ show the length of a terminal core and that of middle cores, respectively. FIG. 3 shows a partial structure of the core member 3 while FIG. 4 shows the die $a$ and the front sectional veiws ($b - e$) of the resulting product for illustrating the molding process of the present invention. As seen in these figures, air blow-in ports 4 provided at the respective tip ends of the core member 3 alternately communicate with separate venting circuits 9 and 10 through the core member 3, the venting circuits 9 and 10, in turn, communicating with a gas supply, not shown, through a switching electromagnetic valve, not shown.

The thermoplastic resin molten and blended by the extruder is fed through the resin path 8 and passed between the die body 2 and the core member 3 and extruded therefrom in the form of the hollow plate structure comprising the outer shell 22 and a number of diaphragms 23. In the hollow plate structure as extruded, the diaphragms 23 extend longitudinally in parallel relationship, and due to the delay in cooling of the diaphragms 23 the warp, twist or the like occur in the structure resulting in inaccurate dimension of the structure. However, according to the present invention, parts of the structure are intentionally crushed by a crusher machine (11) located at a suitable position intermediate a drawing unit 7 and a following cutting mechanism, not shown, to block the hollow sections along the entire length and then pressurized gas such as air is blown into alternate hollow sections of the structure from the gas blow-in ports 4, 4, . . . through the venting circuits 9 and 10. The crusher machine (11) is needed to sufficiently block the hollow section of the extruded hollow plate structure when initiating the molding, and it is shown in the drawing as a tool capable of moving upward and downward. However, it is not always restricted thereto as far as it can block the hollow section completely.

In blowing the pressurized gas into the hollow sections, assume that the venting circuit 9 is first opened (and the venting circuit 10 is closed). That is, in FIGS. 1 and 4, assuming that the gas blow-in ports 4a, 4a, . . . [see die front view of FIG. 4 a] are communicating with the venting circuit 9 while the gas blow-in port 4b, 4b, . . . are communicating with the venting circuit 10, the outer shell 22 of the extruded hollow plate structure is defined by the cooling unit 5 and kept in cooled state so that only the diaphragms 23 are expanded and moved as shown in FIG. 4 (b) upon blowing of the pressurized gas into the gas blow-in ports 4a, 4a, . . . thereby the adjoining hollow sections into which the gas has not been blown are completely crushed to allow the adjacent diaphragms 23 to join and fuse with each other. (In the figures illustrating the molding process of the hollow structure, the symbol O designates that the gas is being blown into while the symbol x designates that the gas is not being blown into. This rule also applies to the other drawings). In the meantime, since the hollow plate structure is being drawn continuously by the drawing unit, upon next switching of the venting circuit, the venting circuit 10 is opened to cause the pressurized gas to blow only from the gas blow-in ports 4b, 4b, . . . so that only the diaphragms 23 are expanded and moved in a similar manner as described above, as shown in FIG. 4 (b) and (e). By repeating the above process, the hollow plate structure 21 having isolated and discrete hollow sections 20 as shown in FIG. 5 can be produced continuously and stably.

In addition, in this method, since the outer shell 22 is pressed to the internal surface of the cooling unit by blowing the pressurized gas, the dimensional accuracy of the product is excellent notwithstanding the delay in cooling of the diaphragms 23. In addition, since no particular skill is required in molding, the loss of the products is very little and hence the process is suited for mass production.

Furthermore, by changing the switching cycle of the switching electromagnetic valve of the gas supply, gas blow-in pressure, drawing rate, extrusion rate or the like, it is possible to vary the length of the isolated hollow sections 20 as desired. In an extreme case, it is possible to mold a product having the diaphragms 23 extending longitudinally in substantially parallel relation, this, of course, being within the scope of the present invention.

Although the core member 3 may be of any shape, in the case of the hollow plate structure 21 described above it is desirable from the standpoints of molding technique as well as the shape of the product that the shape of the core member 3 at the extreme end thereof is designed to give a relationship of $l$ approximating to $m/2$ in view of the expansion of the diaphragms 23.

While alternate gas blow-in by the adjacent gas blow-in ports 4a, 4a, . . . and 4b, 4b, . . . has been explained with regard to the hollow plate structure 21, the present invention should not be limited to the particular illustration. For example, as shown in the die front view of FIG. 6 a, by selectively blowing the gas from the three sets of gas blow-in ports 4a, 4a, . . . , 4b, 4b, . . . and 4c, 4c, . . . communicating with three separate venting circuits, respectively, the expansion and the movement of the diaphragms 23 as shown in FIG. 6 (b), (c) and (d) are repeated to form a final product.

As shown in FIGS. 4 and 6, the hollow structure made by the method of this invention includes a shell having two opposed facing sheets 22 constituting the major surfaces of the structure. The facing sheets are joined by a plurality of partitions or diaphragms 23 each separating two cells or hollow sections. At the extreme left edge of the structure shown in FIG. 4 and 6 is an outer edge wall bounding an outer cell or hollow section and connecting the two facing sheets. In the method the diaphragm between the outer cell or hollow section and the next cell is expanded by fluid pressure so as to fuse to the facing sheets and the edge wall also as shown in FIGS. 4 and 6. Diaphragms between cells are also expanded by fluid pressure so as to fuse to the facing sheets and an adjacent diaphragm also as shown in FIGS. 4 and 6.

For purposes of this application, edge walls and partitions between cells are considered equivalent and the word "diaphragm" as used herein is intended to read on both.

Furthermore, while the above explanation of the present invention has been limited to the hollow plate structure, it should be understood that the present invention may have broader application and it is applicable to any hollow structure. The examples thereof include an L-shaped hollow structure, a cylindrical hollow structure, a laminated hollow structure, as shown in FIGS. 7 to 11. In each of these figures, (I) illustrates a die front view. By alternately blowing the gas from the gas blow-in ports 4a, 4a, . . . and 4b, 4b, . . . communicating with different venting circuits, products having repeated expansion and movement of the diaphragms 23 as shown in (b) and (c) can be produced in a simple and easy manner.

While not shown in the drawings, a heating heater is generally wound around an external periphery of the dye and the elements usually accompanied with the die, such as ununiform thickness adjusting bolt or the like may be provided. The die may be constructed to have a resin path within the die so that the outer shell and the diaphragms may be fed by different extruder machines. It is preferable for the cooling unit 5 to have an inner dimension substantially equal to that of the die body 2 for preparing any shape of product although it may be slightly larger. In order to enable the cooling unit 5 to function fully, it is preferably made of a material to which the molten resin hardly to adhere. Aluminum material with roughed surface is suitable for this purpose.

The thermoplastic resins which can be used in the present invention include hard polyvinyl chloride, polystyrene, polymethylmethacrylate, ABS resin, polypropylene, polyethylene, ethylene-vinyl acetate copolymer, soft polyvinyl chrolide or the like, which can be extruded on a sheet or the like. By appropriately selecting the material, the present invention can be widely applied such as in the fields of construction material, heat insulating material, wrapping material, buffering material or the like.

What is claimed is:

1. A method for manufacturing a hollow structure of thermoplastic resin comprising the steps of forming a resin path by a die body and a core member for the extrusion of the hollow structure comprising an outer shell having a plurality of spaces at an opening thereof and diaphragms, extruding the thermoplastic resin from the die equipped with a gas path into said core member having at least two circuits communicating with said spaces, blowing gas alternately into the spaces within the extruded hollow structure through said circuits to expand and move the diaphragms and fuse alternate diaphragms with their adjoining diaphragms and outer sheets of said shell so that the hollow sections can be formed into isolated chambers for each of the alternate gas blows to prevent the outer shell of the hollow body from expanding substantially by contacting same with a cooling unit following said die body.

* * * * *